W. H. SCHOONMAKER.
METHOD OF TREATING ROADS.
APPLICATION FILED FEB. 23, 1912.

1,114,189.

Patented Oct. 20, 1914.

Witnesses:

Inventor
William H. Schoonmaker
By his Attorneys

UNITED STATES PATENT OFFICE.

WILLIAM H. SCHOONMAKER, OF MONTCLAIR, NEW JERSEY, ASSIGNOR TO SAM E. FINLEY, OF ATLANTA, GEORGIA.

METHOD OF TREATING ROADS.

1,114,189.  Specification of Letters Patent.  Patented Oct. 20, 1914.

Application filed February 23, 1912. Serial No. 679,529.

*To all whom it may concern:*

Be it known that I, WILLIAM H. SCHOONMAKER, a citizen of the United States, and a resident of Montclair, county of Essex, and State of New Jersey, have invented certain new and useful Improvements in Methods of Treating Roads, of which the following is a full, clear, and exact description.

My invention relates to a method of treating roads to lay the dust and produce a smooth, hard and neat wearing surface and comprises raising the dust from the road surface and applying a spray of suitable liquid to the dust so raised and then permitting the so-impregnated dust to fall upon the road bed.

In the accompanying drawings I illustrate more or less diagrammatically apparatus for carrying out my invention.

Figure 1:
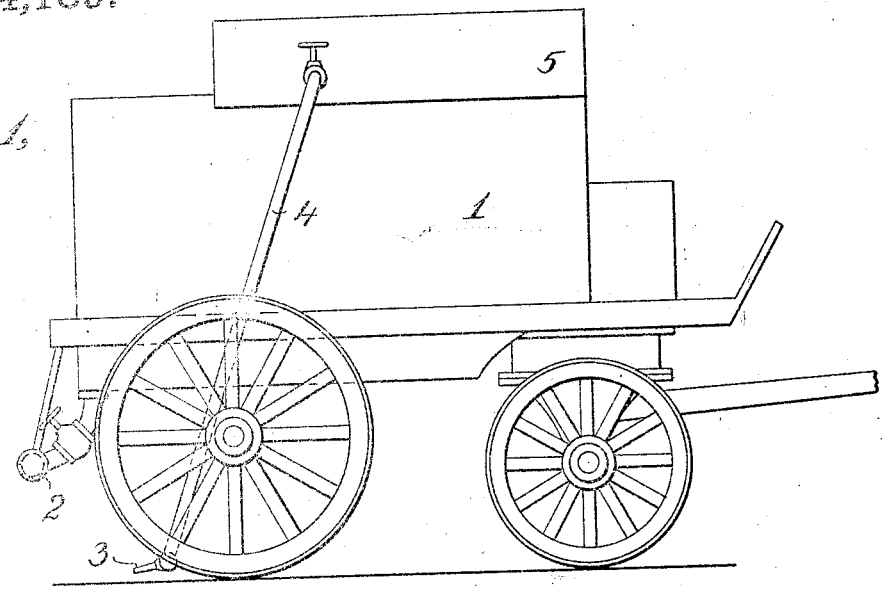
Figure 2:
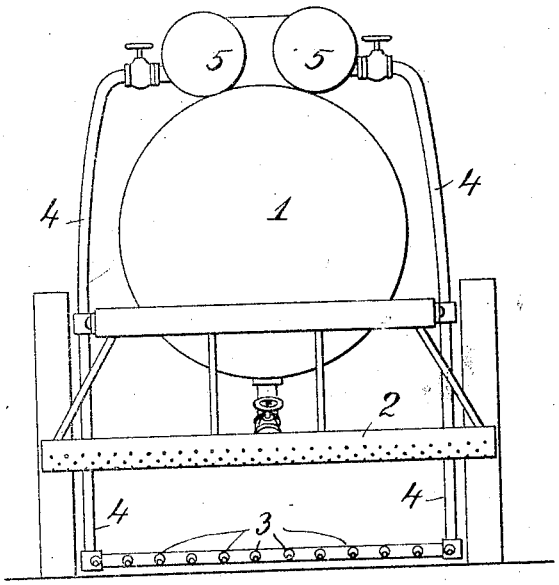

In said drawings: Figure 1 shows a side elevation of a suitable apparatus, and Fig. 2 an end view thereof.

In carrying out my invention, I proceed as follows: First, the finely divided or powdered earth, rock and other matter generally termed dust lying on the road surface in such condition that it may be blown with the wind or otherwise raised and thrown into the atmosphere, is so raised and caused for the moment to rest or float in the air. This may be accomplished by a broom, air blast or other means. Next, there is thrown into this dust a finely divided spray of oil or other liquid, causing the oil particles to adhere to the dust particles and form an intimate mixture of the oil and dust. Preferably the oil spray is produced and propelled by an air blast or jet. Finally, the intimate mixture of dust particles and oil particles is precipitated to the road bed or surface from which the dust was raised. This is best accomplished naturally, through the force of gravity.

The result is that the surface of the road is covered with the dust, the particles of which are each intimately united with the particles of oil. This forms a tough, heavy surface and is distinguished from the usual method of oiling roads in that the oil is not simply thrown on the dust covered road and partly soaked into part of the dust, but is intimately united with each and every particle and makes a uniform covering which will not "track" or adhere to the feet of pedestrians or to the wheels of vehicles.

While the aforegoing detailed method of procedure is deemed preferable, I would point out that if conditions are such as to warrant it, an atomized jet or spray of oil or other liquid may be thrown directly on the road bed, combining with the dust particles either completely on the road bed or partly on the road bed and partly in the atmosphere.

In the accompanying drawings I have illustrated more or less diagrammatically apparatus suitable for carrying out my invention.

In said drawings, 1 designates a tank mounted upon suitable wheels for containing the oil or other liquid with which the dust is to be treated; said tank 1 being provided with a spray pipe 2. As a diagrammatic illustration of one means for raising the dust, I have indicated in these drawings, air nozzles 3 receiving compressed air through pipes 4 from tanks 5. The nozzles 3 are so directed that the jets of air issuing therefrom raise the dust from the surface of the road and the oil or other liquid issuing as a finely atomized spray from sprinkler pipe 2 impregnates the dust while so in suspension in the air, the impregnated dust then falling to the road surface.

Having thus described my invention what I claim as new and desire to secure by Letters Patent is:

1. The method of treating roads which consists in raising into the atmosphere finely divided matter from the surface thereof, applying to such matter when so raised, a spray of liquid and precipitating the mixture to the road surface.

2. The method of treating roads which consists in raising into the atmosphere the finely divided matter from the surface thereof, applying to such matter when so raised, a spray of oil and precipitating the mixture to the road surface.

In testimony whereof I have signed my named to this specification in the presence of two subscribing witnesses.

WILLIAM H. SCHOONMAKER.

Witnesses:
MARTIN BOURKE,
C. W. FAIRBANK.